United States Patent [19]

Vogelgesang

[11] Patent Number: 5,620,083
[45] Date of Patent: Apr. 15, 1997

[54] CONTROL ARRANGEMENT FOR FINGERS OF A ROTARY CONVEYOR

[75] Inventor: Claus-Joseph Vogelgesang, Mandelbachtal, Germany

[73] Assignee: Deere & Company, Moline, Ill.

[21] Appl. No.: 500,291

[22] Filed: Jul. 10, 1995

[30]     Foreign Application Priority Data

Jul. 15, 1994 [DE]  Germany ..................... 44 25 142.4

[51] Int. Cl.$^6$ .................................................. B65G 35/00
[52] U.S. Cl. ...................... 198/722; 198/613; 198/693; 56/364
[58] Field of Search .................................. 198/513, 518, 198/613, 693, 722, 723; 56/12.4, 12.5, 14.5, 364

[56]                References Cited

U.S. PATENT DOCUMENTS

| | | | |
|---|---|---|---|
| 2,133,143 | 10/1938 | Innes | 198/518 |
| 2,701,634 | 2/1955 | Carroll | 198/613 |
| 2,748,921 | 6/1956 | White | 198/613 |

FOREIGN PATENT DOCUMENTS

A1-0-567 192  10/1993  Germany.

*Primary Examiner*—Joseph E. Valenza

[57]                ABSTRACT

A rotary conveyor includes a cylindrical housing forming part of a centering auger having opposite ends respectively mounted for in a pair of supports for rotation about a horizontal axis. A finger assembly is mounted in a central portion of the housing between auger flighting secured to opposite end portions of the housing. The finger assembly includes a crankshaft having a cranked central portion that is eccentric to and located in the central portion of the housing. Fingers are mounted for pivoting about the cranked central portion of the crankshaft and are slidably received in openings provided in the housing. Opposite ends of the crankshaft are supported in the pair of supports for rotating about said horizontal axis. One end portion of the crankshaft extends through one of the supports and has a retainer fixed thereto. A flange is releasably fixed to the one support just inwardly of the retainer and carries a rib extending arcuately about the crankshaft and having opposite ends defining a pair stops located in the path of movement of the retainer. Resistance of crop engaged by the end sections of the fingers projecting through the openings in the housing causes the crankshaft to be rotated to move the retainer from one stop to the other when the direction of rotation of the housing is reversed, as when a jam occurs in the flow of crop material through the conveyor.

9 Claims, 2 Drawing Sheets

CONTROL ARRANGEMENT FOR FINGERS OF A ROTARY CONVEYOR

BACKGROUND OF THE INVENTION

The present invention concerns rotary conveyors and more specifically relates to arrangements for controlling intake fingers of the conveyor by controlling the position of an eccentric part of a crankshaft on which the fingers are mounted relative to the axis of rotation of a drum having openings slidably receiving the fingers.

EP-A1-0 567 192 reveals an undershot auger conveyor of a harvesting machine including a rotating drum having a horizontal axis of rotation and to which is attached helical vanes and within which is located an intake finger assembly. The intake finger assembly includes a crankshaft whose eccentric central region is designed to pivotally support the intake fingers. Provided in the wall of the central region of the drum are openings respectively aligned with an slidably receiving the fingers of the intake finger assembly. The drum is driven in order to convey crop and as it rotates the intake fingers are carried along by the wall in the circumferential direction and are thereby caused to pivot about their respective connections with the central region of the crankshaft, but the crankshaft itself is retained in a fixed location by flanges. Accordingly the intake fingers extended between a completely retracted position and a fully extended position during a rotation of the drum, so that they can safely grasp crop on the one side of and can safely release it on the other side of the drum. Although the crankshaft is fixed against rotation, it can nevertheless be pivoted within certain limits and retained at another location, if the flanges are released and rotated into another position. In this way the conveying performance of the intake fingers can be changed. It is known in the art to reposition the intake fingers by using a remotely controlled electric motor. In case the rotation of the drum is reversed, the intake fingers are adjusted in such a way that they work in a reverse mode to remove the crop from a further conveyor, normally downstream of the rotary conveyor, and do not add any new crop.

This sort of intake finger control has the disadvantage that it requires an electric or hydraulic motor and plug-in connections at the interface between the harvesting machine and the crop gathering attachment that includes the rotary conveyor, which leads to high costs.

SUMMARY OF THE INVENTION

According to the present invention, there is provided an improved arrangement for controlling intake fingers, carried by an eccentric shaft located within a drum having openings slidably receiving the fingers.

A broad object of the invention is to provide an intake finger control for a conveyor, of the type described above, that produces the desired conveying effect for forward or reverse operation of the conveyor without the use of an additional motor.

A more specific object of the invention is to provide a conveyor, of the type described above, wherein the crankshaft carrying the intake fingers is mounted in such a way as to be freely moved between different extremes of adjustment by the resistance of the crop acting upon the end of the intake fingers extending from the drum, with the crankshaft thus moving to one extreme position during rotation of the conveyor in a first direction and moving to the other extreme position during rotation of the conveyor in the opposite direction.

A further object of the invention is to provide a conveyor, as set forth in the previous object, wherein the ease of moving the crankshaft between its extreme positions is enhanced by mounting a counterweight to the crankshaft for offsetting the moment developed in the concentric portion of the shaft due to the weight of the eccentric portion and the fingers carried thereby.

These and other objects will become apparent from a reading of the ensuing description together with the appended drawings.

DESCRIPTION OF THE PREFERRED EMBODIMENT

Figure 1:
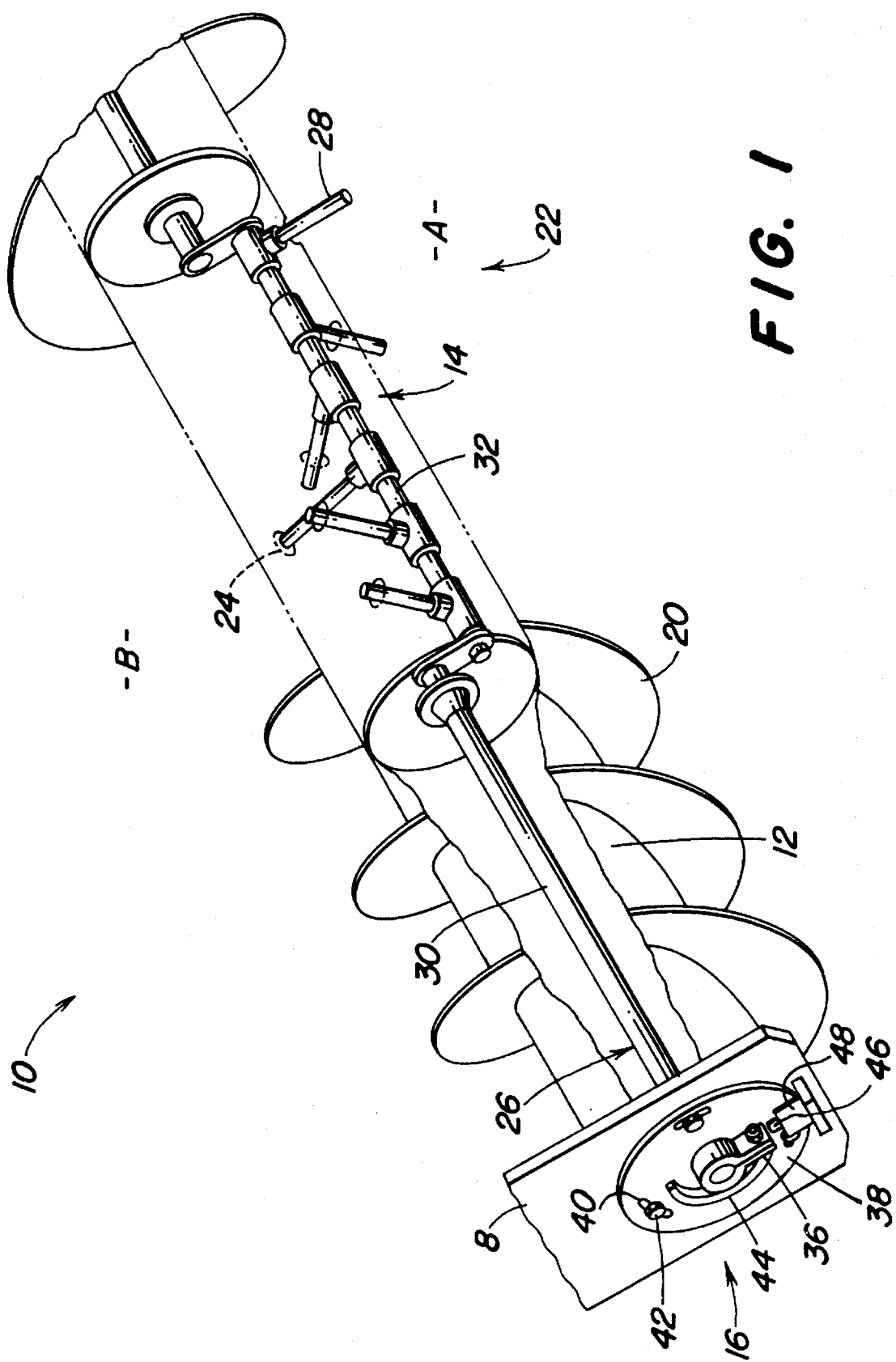
FIG. 1 shows a perspective view of a portion of a rotary conveyor having a finger control arrangement constructed in accordance with the principles of the present invention.

Referring now to FIG. 1, there is shown one of a pair of transversely spaced side walls 8 of a rotary conveyor 10 of a type applied in particular in agricultural machines. Such rotary conveyors 10 are frequently used to gather together crop and deliver them to a further, narrower conveyor. Accordingly such rotary conveyors 10 can be found in cutter heads, corn choppers, corn pickers, pick-ups and the like.

Specifically, the rotary conveyor 10 is composed of a cylindrical housing or drum 12, an intake finger assembly 14 and a finger control arrangement 16, constructed in accordance with the principles of the present invention.

The housing 12 is formed from sheet metal and has a diameter of approximately 200 to 400 mm. Opposite ends of the housing 12 are rotatably supported in bearings (not shown) carried by the side walls 8. Helical vanes 20, of opposite hand, are secured to the circumferential surface of and extend inwardly along the housing 12 from the opposite ends thereof so as to convey the crop to the center of the housing during rotation of the housing 12. A central region 22 of the housing 12 between the sets of vanes 20 contains the intake finger assembly 14 and is provided with a plurality of openings 24. During operation, the housing 12 is brought into rotation by drive components, not shown, such as gears and chains. The intake finger assembly 14 is composed of a crankshaft 26 and a plurality of intake fingers 28. Opposite ends sections of the crankshaft 26 extend along and are supported for rotation about the axis of the housing 12. As illustrated, a right-hand end section 30 of the crankshaft 26 extends outward through the bearing (not shown) supporting the right-hand end of the housing 12, it being noted that the housing 12 could instead be rotatably supported on the crankshaft section 30. However, the crankshaft 26 itself is supported, free to rotate, by at least one bearing, not shown, with the lowest possible friction at the side wall 8. This bearing is preferably configured as a self-aligning rolling contact or journal bearing, which follows a radial deflection of the crankshaft, or of the bearing of the housing 12, and thereby keeps the frictional resistance low. As journal bearings, ball sockets known from tractor three-point hitch technology are particularly appropriate. A central section 32 of the crankshaft 26 is located within the central region 22 of the housing 12 and is offset from the axis of the remainder of the crankshaft so as to be eccentric to the axis of rotation of the housing 12. Inner ends of the fingers 28 are mounted, as by bearings 34, for swivelling freely about the crankshaft section 32, the fingers 28 extending through respective ones of the openings 24, which are located at staggered locations along the central region 22 of the housing 12 so that the fingers have portions of different lengths located exteriorly of the housing 12. The openings 24 may be provided with bearing member to slidably support the fingers. In the present case the rotary conveyor 10 is configured as an undershot conveyor, therefore the intake fingers 28 extend to the greatest degree possible from the housing 12 in a forward, upstream region -A-, while they extend as little as possible from the housing 12 in a rear, downstream region -B- that leads to a further conveyor, not shown.

A retainer 36 is provided for selectively fixing the crankshaft 26 against rotation, and hence for fixing the eccentric section 32 in place so that the fingers 24 operate in a desired fashion during rotation of the housing 12. Specifically, the retainer 36 is in the form of a split collar received on and clamped to a right-hand end portion, of the right-hand crankshaft section 30, which extends and beyond the support 8. Located inwardly of the retainer 36 is a bearing flange or shield 38 positioned against a right-hand surface of the support 8. The flange 38 is provided with three arcuate adjustment slots 40 that are aligned with three threaded holes (not visible) provided in the support 8. Received in each slot 40 and aligned threaded hole is a screw 42, with the three screws 42 acting to releasably clamp the flange 38 to the support 8. In addition, fixed to the flange 38 and having opposite ends defining stops 44' and 44" located in the path of movement of the retainer 36 during rotation of the crankshaft 26 is an arcuate rib 44. Thus, within the limits established by the slots 40, it is possible to adjust and fix the angular position the stops 44' and 44" which cooperate with the retainer 36 to prevent the crankshaft 26 from rotating with the housing 12 during operation. It should be understood that in place of the stops 44', 44" or in addition to them a lock, in particular a remotely controlled lock such as a pin 46 operated by a solenoid 48, for example, could be extended into the path of movement of the retainer 36 for completely blocking its movement, the pin being shown retracted in FIG. 1.

Figure 3:
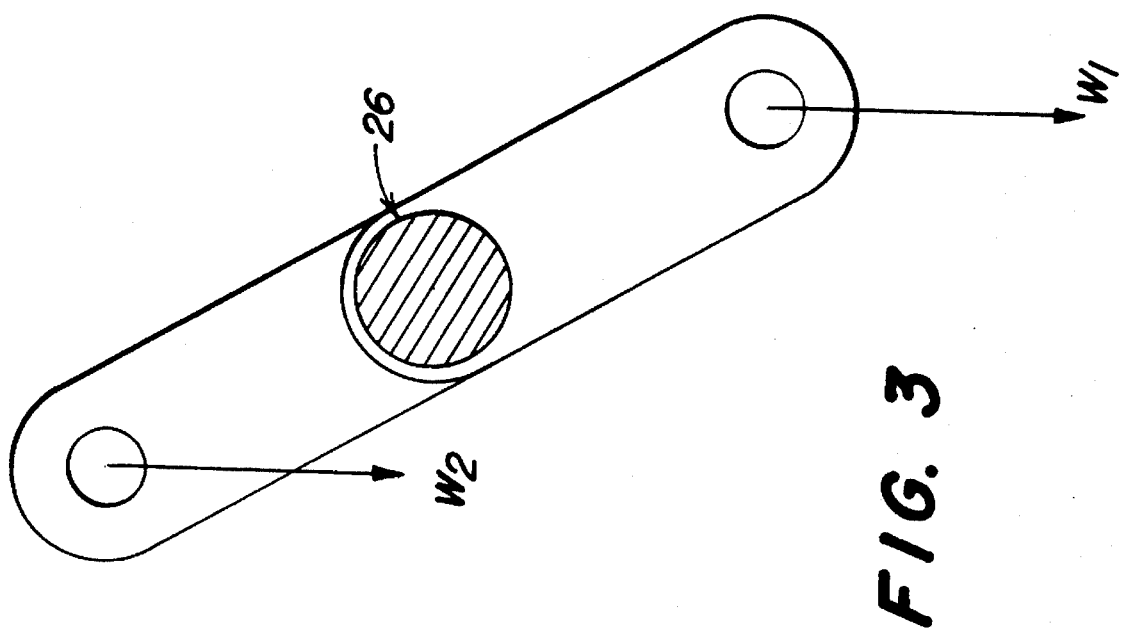
FIG. 3 is an end view of the crankshaft showing a first weight representing the eccentric portion of the crankshaft together with the fingers and showing a second weight representing a counterweight to the crankshaft for balancing the moment due to the first weight.

Referring now to FIG. 3, it can be seen that a weight first $W_1$, representing the weight of the eccentric portion of the crankshaft 26 together with the fingers 28 will cause a clockwise moment to be imposed on the crankshaft 26. Mounted to the crankshaft 26 for the purpose of at least partially balancing this moment is a second weight $W_2$, representing a counter weight having a weight equal to the first weight $W_1$ so as to cause a counterclockwise moment, equal in magnitude to the moment caused by the first weight, to be imposed on the concentric portions of the crankshaft 26. Accordingly the crankshaft 26 is nearly in a balanced condition and is therefore able to pivot from the one to the other end position even with small external loads.

The features of the rotary conveyor 10 as described above apply equally to other rotary conveyors from the current state of the art.

On the basis of the preceding description the control arrangement 16 according to the invention operates as follows.

Figure 2:
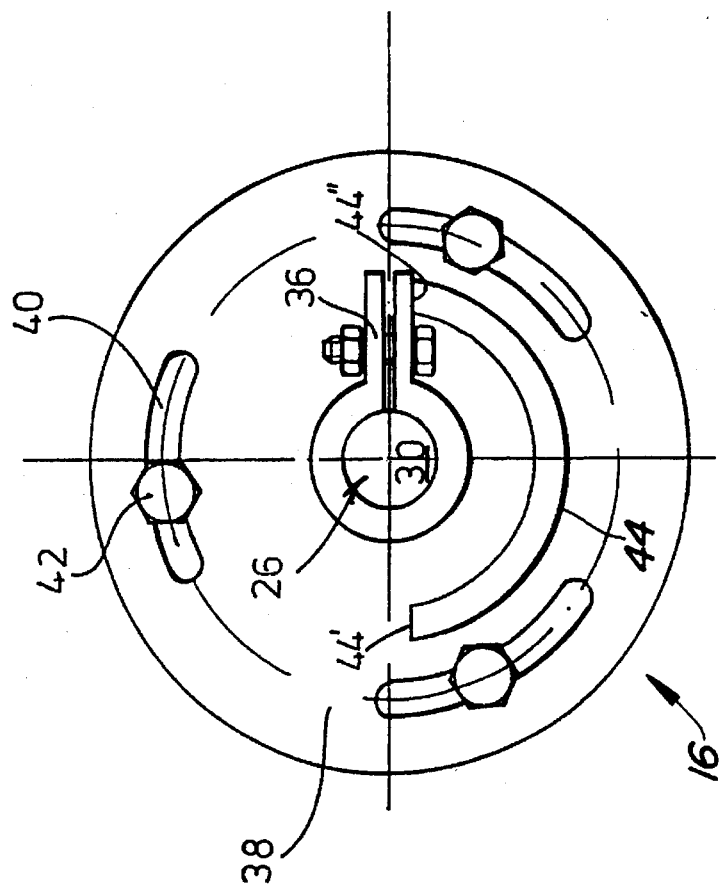
FIG. 2 shows a side view of the control arrangement illustrated in FIG. 1.

The housing 12 is brought into rotation in the sense of an undershot conveyor, that is, in the clockwise direction as seen in FIG. 1. As soon as material to be conveyed is found in the region -A- where the intake fingers 28 extend various amounts beyond the housing 12, the intake fingers 28 are pivoted by the force now applied by the material in the counterclockwise direction about points located at respective openings 24 in the wall of the housing 12. Due to this pivoting movement the eccentric part 32 of the crankshaft 26 is moved downward, so that the crankshaft 26 as a whole is also pivoted in the clockwise direction until the retainer 36 is brought into contact with the stop 44", as shown in FIG. 2. Once the crankshaft 26 can no longer pivot further, the material is carried along by the housing 12 and the intake fingers 28 in the circumferential direction until it reaches the further conveyor, not shown, located downstream adjacent the delivery region -B-, the intake fingers 28 in this region being retracted far into the housing 12 so as to immediately release material being moved thereby.

In the event that the rotary conveyor 10 becomes jammed, that is, too much material to be conveyed has reached the area between the housing 12 and its helical vanes 20 and a pan, not shown, that partially surrounds its circumference, then the drive to the housing 12 is reversed so that it rotates counterclockwise, as viewed in FIG. 1. As soon as the housing 12 rotates in the opposite direction, the sections of the intake fingers 28 extending from the housing 12 in the region -A- are loaded with material to be conveyed with the result that the intake fingers 28 pivot counterclockwise about the theoretical or the actual pivot point in the wall of the housing 12 and thereby swing the eccentric part 32 of the crankshaft 26 upward; thereupon the crankshaft 26 rotates in counterclockwise direction and thereby retracts those fingers projecting through the housing 30 in the region -A- while extending those fingers projecting through the housing 30 in the region -B-. This process continues until the retainer 36 comes into contact with the other stop 44'. As soon as the retainer 36 makes contact with the stop 44', the intake fingers 28 cannot escape the external force and thereupon carry the material in the opposite direction due to the rotation of the housing 12, in order to remove the jam.

In this way the position of the intake fingers is automatically controlled by the resistance of the crop acting upon the end of the intake fingers extending from the housing. Accordingly in normal undershot conveying as well as in reverse operation the crankshaft is pivoted into a position, by means of the eccentric central region, in which the intake fingers extend sufficiently far out of the housing in each case at the upstream position. Only small resistances to conveying are sufficient, since the crankshaft is pivoted loosely, that is, against a barely perceptible resistance. Hence neither an electric nor a hydraulic motor nor a rope pull or the like are required, by means of which the crankshaft is pivoted. Instead the pivoting occurs automatically depending upon the direction of rotation and the applied load. As already achieved in the state of the art—only now with simpler means—that material taken in and jammed is conveyed in reverse and that material located upstream of the rotary conveyor is not carried in overshot manner. Obviously this invention can also be applied to overshot rotary conveyors. The term "rotary conveyor" is not intended to be confined to screw conveyors; it applies equally to other rotary conveyors that use belts, chains, disks and the like, that operate with intake fingers, but particularly screw conveyors or drum conveyors that take up crop to be conveyed tangentially or circumferentially and deliver it in the same manner at another location.

If it is desired to change the zone where the fingers 28 pickup and deliver crop, it is necessary only to adjust the positions of the stops 44' and 44" by loosening the screws 42 and turning the flange or shield 38 to a new position and then retightening the screws.

If is desirable to prevent free pivoting movement of the crankshaft 26 between adjusted positions in response to reversing the rotation of the housing 12, this can be done by providing actuating the coils of the electromagnetically controlled pin 46 which causes the pin to travel outwardly into blocking relationship to the movement of the retainer 36 so as to retain it in one or the other of its extreme positions.

While not absolutely necessary, the counterweight $W_1$ may be mounted on the crankshaft 26 to oppose the moment imposed on the crankshaft due to the eccentricity of the crankshaft and the intake fingers, this balance in forces resulting in a decrease in the resistance of the crankshaft to movement between its extreme positions and thus making it possible for the crankshaft to move between its opposite extremes with very little resistance being encountered by the fingers 28 during reversal of the direction of rotation of the housing 12o Furthermore, it is to be noted that the resistance to rotation of the crankshaft 26 is particularly low when it is supported in self-aligning bearings.

I claim:

1. In a rotary conveyor of the type including a cylindrical housing extending between and being mounted in a pair of supports for rotation about a horizontal axis, a finger assembly being located within said housing and including a crankshaft having end portions supported for pivoting about said axis and a crank portion disposed eccentrically to said axis and at least one finger being mounted for swivelling about said crank portion of the crankshaft and being located for sliding freely in an opening provided in said housing, the improvement comprising: said crankshaft being free to pivot between two angularly spaced end positions upon the direction of rotation of said housing being reversed and a resistive forcebeing applied, in a direction opposite to the direction of rotation of the housing, to an end portion of said intake finger projecting outwardly from said housing.

2. The rotary conveyor defined in claim 1 wherein said end positions are determined by fixed stops.

3. The rotary conveyor defined in claim 2 wherein one of the end portions of said crankshaft extends outwardly of said support; a retainer being fixed to said one of the end portions of said crankshaft; and said stops respectively being located for engagement by said retainer when said crankshaft is located in one or the other of said end positions.

4. The rotary conveyor defined in claim 2 wherein the angular position of at least one of said stops can be repositioned.

5. The rotary conveyor defined in claim 3 and further including a lock having a blocking element mounted for selective movement to and from the path of movement of the retainer whereby the latter may be prevented from moving from one or the other of said end positions.

6. The rotary conveyor defined in claim 5 wherein said lock includes remotely controllable means coupled to said blocking element for moving the latter to and from the path of movement of said retainer.

7. The rotary conveyor as defined in claim 1 and further including a counterweight mounted to said crankshaft for balancing the effect the weight of the eccentric portion and finger have on the remainder of the crankshaft as concerns its rotation between said end positions to thereby minimize the amount of force required to be applied to the finger for moving the crankshaft between its end positions.

8. The rotary conveyor as defined claim 1 wherein a retainer in the form of a split collar is clamped to one of said end portions of said crankshaft, the collar sweeping out a path during movement of said crankshaft between said end positions; a flange being located between said retainer and said support; an annular rib being located on said flange and having opposite ends defining stops located in the path of movement of said retainer and being respectively engagable by said retainer when the crankshaft is in its end positions.

9. The rotary conveyor as defined in claim 8 wherein said flange is adjustable about said crankshaft, whereby said stops are adjustable.

* * * * *